United States Patent [19]

Ginnis et al.

[11] Patent Number: 4,807,996
[45] Date of Patent: Feb. 28, 1989

[54] TRANSIENT HOLOGRAPHIC INDICATION ANALYSIS

[75] Inventors: Andrew F. Ginnis, Glastonbury; Wesley F. Larkin, South Windsor, both of Conn.

[73] Assignee: United Technologies Corporation, Hartford, Conn.

[21] Appl. No.: 72,387

[22] Filed: Jul. 10, 1987

[51] Int. Cl.$^4$ .............................................. G01B 9/029
[52] U.S. Cl. ........................................ 356/347; 73/656
[58] Field of Search ................... 356/347, 348; 73/656

[56] References Cited

U.S. PATENT DOCUMENTS

| | | | |
|---|---|---|---|
| 3,545,259 | 12/1970 | Grant | 73/656 X |
| 3,645,129 | 2/1972 | Grant | 73/67 |
| 3,666,344 | 5/1972 | Mottier | 350/3.5 |
| 3,762,215 | 10/1973 | Aleksoff | 73/71.3 |
| 3,860,346 | 1/1975 | Kersch et al. | 356/109 |
| 3,899,921 | 8/1975 | Hockley | 73/67.2 |
| 4,080,823 | 3/1978 | Stargardter | 73/655 |
| 4,408,881 | 10/1983 | Clarady, Jr. et al. | 356/347 |
| 4,507,766 | 4/1985 | Crostack | 73/603 |

FOREIGN PATENT DOCUMENTS 1261186 1/1972 United Kingdom .

OTHER PUBLICATIONS

Doty et al. "The use of sandwich hologram interferometry for nondestructive testing of nuclear reactor components", *Optical Engineering* vol. 21, No. 3, pp. 542-547, Jun. 1982.

Publication: "Applications of Holography to Dynamics: Hight-Frequency Vibrations to Plates", p. 1083, Journal of Applied Mechanics, vol. 37, Dec. 1970.

*Primary Examiner*—Davis L. Willis
*Assistant Examiner*—Matthew W. Koren
*Attorney, Agent, or Firm*—Kevin E. McVeigh

[57] ABSTRACT

A method of holographic analysis of an article is disclosed. The method involves generating holograms of an article to be analyzed and a reference article over a range of excitation energy levels and comparing the features of the holograms so generated to characterize the material and structural properties of the article.

6 Claims, 1 Drawing Sheet

TRANSIENT HOLOGRAPHIC INDICATION ANALYSIS

TECHNICAL FIELD

The field of art to which this invention pertains is non-destructive testing by means of holographic analysis.

BACKGROUND ART

Time average holography is a technique which applies holographic interferometry to the study of the surface deformation of vibrating objects. The technique involves photographically recording the interference pattern between a coherent light source and light reflected from a vibrating object illuminated by the coherent light. U.S. Pat. No. 3,645,129 and commonly assigned U.S. Pat. No. 4,408,881 disclose methods for testing the integrity of bonded joints between two members by time average holography. The disclosure of commonly assigned as U.S. Pat. No. 4,408,881 is disclosures incorporated herein by reference. In each of these methods a hologram of the bonded joint is generated while the joint is being vibrated. If there is a discontinuity in the bond, the two members vibrate independently of each other and a number of superimposed interference fringes appear against the background of the hologram as a contrasting area. The method is useful as a non-destructive quality control test for articles having bonded joints.

In practice the method has been found to be unreliable in some applications because of an inability to distinguish between indications associated with disbonds and those associated with other causes. Consequently, a significant number of false positive readings may result from the conventional method.

DISCLOSURE OF THE INVENTION

A holographic analysis method is disclosed. The method involves generating, at different excitation energy levels, a series of holograms of an article and of a reference article which contains a known anomaly, comparing the holograms, and analyzing the differences between the holograms to characterize the material and structural properties of the article.

The foregoing and other features and advantages of the present invention will become more apparent from the following description and accompanying drawings.

BEST MODE FOR CARRYING OUT THE INVENTION

Figure 1A:
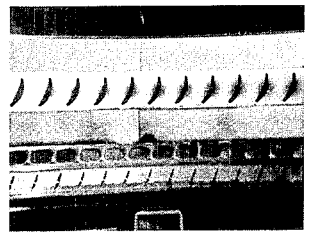
FIG. 1A is a hologram of a reference article at a high excitation energy level.

The holographic analysis method of the present invention is useful for quality control of a series of similar articles. In the best mode embodiment shown a reference article which contains a known material anomaly that has been independently characterized, is used to generate at least two reference holograms. The first reference hologram is generated according to the conventional method of holographic analysis. The reference article is caused to vibrate by the application of an excitation energy. Excitation energy may be applied by, for example, a piezoelectric shaker. The excitation energy level and thus the intensity of vibration applied to the reference article will vary in different situations and must be experimentally determined for each particular type of article and particular test apparatus. It is preferable to use a force that will excite the disbonded areas, but which will impart very small amplitudes to the resonant modes of the test object, so that defects in the bond will stand out with maximum clarity. A first energy level is determined which reveals a clearly defined indication of the reference anomoly that is in strong contrast to the background. Once the energy level which shows the clearly defined and strongly contrasting indication of the reference anomaly is found, the analysis continues according to the present invention.

According to the present invention, at least two and preferably three or more reference holograms are generated. A second reference hologram of the reference article is generated at a second excitation energy level that is below the first energy level. The second excitation energy level is chosen such that the indication of the anomaly is just visible against the background. It is preferred that the second excitation energy be determined systematically, as for example, by evaluating the effects of incremental decreases in excitation energy level until the indication of the anomaly disappears. The excitation energy level is then increased slightly until the indication is visible against the background. The excitation energy level at which the indication again becomes detectable would correspond to the preferred second excitation energy level.

It is preferred that three holograms be generated each at a different excitation energy level and particularly preferred that a plurality of holograms be generated across a spectrum of excitation energies so that a relationship may be developed between the rates of change of characteristics of the indication of the anomaly, most importantly the shape, size, edge definition and contrast of the indication, as a function of excitation energy. The relationship so developed may then be correlated to characterize the specific anomaly of interest.

The number of holograms necessary to develop sufficient information to characterize a particular anomaly with confidence will depend upon the particular nature of the article and of the anomaly.

If holograms are generated at more than two excitation energy levels, it is preferred that the third hologram be generated at an excitation energy level above the first excitation energy level yet below an excitation energy level that results in a loss of contrast of the indication due to excessive background noise. The third excitation energy level is determined in a manner similar to that used to determine the second excitation energy level. It is preferred that the third excitation energy level be determined systematically, as for example, by evaluating the effects of incremental changes from the first energy level to that energy level at which the indication becomes difficult to distinguish due to the loss in contrast caused by excessive background noise. The preferred third energy level would correspond to that energy level just lower of that causing the excessive background noise.

Once the reference holograms have been generated, analysis of the test article may proceed. A hologram of the article is generated at the first excitation energy level and the hologram is examined to determine if it contains an indication of an anomaly in the article. If no indication is apparent, the article need not be further examined. If the hologram at the first energy level reveals an indication of an anomaly in the article, a second hologram of the article is generated at the second energy level. If a plurality of reference holograms each corresponding to different excitation energy levels are available, then a plurality of holograms of the test article may be generated at energy levels corresponding to those used in the reference holograms.

The holograms so generated are compared to each other to evaluate the transient nature of the appearance of the indication. The key features of the indication are the geometry and intensity of the indication. Changes in the shape and intensity of the indication and particularly changes in the distinctness of the edge of the indication as well as differences in the rate at which the changes in the indication occur relative to the changes in excitation energy are analyzed to determine the probable cause of the indication. The probable cause may be determined by comparing the differences in response of the indication in the hologram of the test article with changes in excitation energy levels to the response of the indication in the holograms of the reference article with changes in excitation energy levels.

For example, in the case of a bonded fiber metal abradable seal, conventional holographic analysis produces holograms in which the indication associated with a discontinuity in the bonded joint cannot be readily distinguished from an indication associated with a variation in the density of the porous fiber metal material. The distinction is important because density differences are acceptable for a quality control standpoint, while discontinuities in the bond, known as "disbonds" are not acceptable. In the method of the present invention, the intensity of the indication associated with a disbond decreases more slowly with decreasing excitation energy level than does the indication associated with a density difference. The indication associated with the disbond will remain detectable at lower energy levels than will the indication associated with the density difference. The size of an indication associated with a disbond will typically remains relatively unchanged with changes in excitation energy level, while the indication associated with a density difference will typically undergo a relatively marked change in size with changes in excitation energy level. The edge definition of an indication associated with a discontinuity in the bonded joint is more distinct than the edge definition associated with a density difference as the excitation energy level is changed. The edge of an indication associated with a density difference typically remains indistinct even at high excitation energy levels.

Analysis of the differences between the holograms of the fiber metal being tested and holograms of a reference fiber metal seal permit a disbond to be distinguished from a density difference. False positive findings and the resultant unwarranted high rejection associated with the conventional method are reduced by application of the method of the present invention.

An automated method of analysis wherein the holograms are digitized and the indications of material anomalies are compared to a library of transient indication behavior correlated to specific material anomalies is a possible refinement of the method of the present invention. Such a comparison would include, but not be limited to developing and comparing specific intensity values, gradients and changes in size and shape of the indications.

EXAMPLE

A bonded joint in a fiber-metal abradable seal for a turbine engine was analyzed according to the method of the present invention. Holograms of a reference abradable seal are presented in FIGS. 1A, 2A and 3A. The reference abradable seal contained a known disbond in the joint. Holograms of the abradable seal to be analyzed are presented in FIGS. 1B, 2B and 3B. FIGS. 2A and 2B are holograms generated at a first energy level, as discussed above. An indication of the disbond in the reference article is visible as a contrasting sharply defined area of FIG. 2A. The contrasting area in FIG. 2B would be regarded as an indication of a possible disbond in the test article.

Figure 3A:
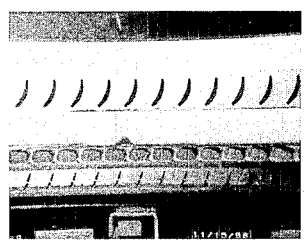
FIG. 3A is a hologram of a reference article at a low excitation energy level.
Figure 3B:
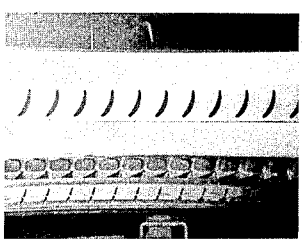
FIG. 3B is a hologram of a test article at a low excitation energy level.

FIGS. 3A and 3B are holograms generated at a second energy level. In this example the second energy level corresponds to a scale reading forty percent lower than the scale reading associated with the first energy level. While the indication of the disbond in the reference hologram remains visible and sharply defined at the reduced energy level, there is no indication of a disbond in the hologram of the test article shown in FIG. 3B.

Figure 1B:
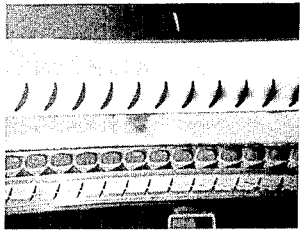
FIG 1B is a hologram of a test article at a high excitation energy level.
Figure 2A:
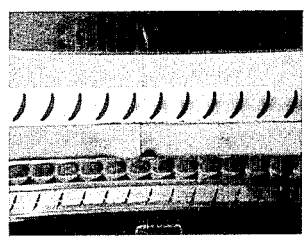
FIG. 2A is a hologram of a reference article at an optimal excitation energy level.
Figure 2B:
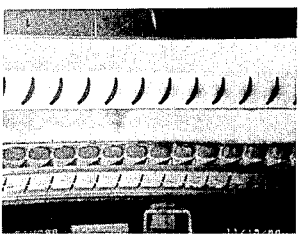
FIG. 2B is a hologram of a test article at an optimal excitation energy level.

FIGS. 1A and 1B are holograms generated at a third energy level. In the example, the third energy level corresponds to a scale reading forty percent above the scale reading associated with the first excitation energy level. Both the indication of the disbond in the reference article and the background are of higher intensity than in the hologram shown in FIG. 2A, and the contrast between the indication and background is diminished relative to FIG. 2A, but the indication is still well defined. The intensity of the indication in the hologram of the test article shown in FIG. 1B has increased but the edge is diffuse and poorly defined.

The rates of change of the size, shape, edge definition and intensity of the indication of the disbond in the reference article are less than the rates of change of the size, shape, edge definition and intensity of the indication in the test article for the same change in excitation energy.

The findings that the indication in the hologram of the test article disappears at the low excitation energy level, has a poorly defined boundary at the high energy level, and that the size, shape, edge definition and intensity of the indication in the hologram of test article changes rapidly versus changes in excitation energy level than the indication of the disbond in the hologram of reference article all imply that the indication in the holograms of the test article are not caused by a disbond. Based on this analysis the test article was determined to be free of disbonded areas. This conclusion was confirmed by destructive testing of the test article.

The method of holographic analysis of the present invention allows indications of material anomalies to be categorized as to their probable cause. The method is useful as a non-destructive quality control test and provides improved reliability relative to conventional holographic inspection techniques due to the ability of the present method to distinguish between possible causes of holographic indications. This feature of the method allows false positive results and consequent unwarranted high rejection rate to be reduced.

While the best mode is described in terms of time average holography and analysis of bonded joints, it will be readily appreciated that the usefulness of the method disclosed is not limited to time average holography nor to bonded joint analysis. The method of the present invention may be applied to any technique of holographic interferometry and to the analysis of articles other than bonded joints which contain material anomalies other than joint disbonds. For example, the method might be applied to the analysis of a laminated structure to detect the presence of delaminations.

Although this invention has been shown and described with respect to detailed embodiments thereof, it will be understood by those skilled in the art that various changes in form and detail thereof may be made without departing from the spirit and scope of the claimed invention.

We claim:

1. A method of characterizing an article, comprising:
   generating a first reference time-average hologram of a reference article by vibrating the reference article at a first amplitude of vibration, wherein the reference article includes a known anomaly and the first amplitude of vibration is selected so that the first reference time-average hologram reveals a first reference indication of the known anomaly against a first reference background,
   generating a second reference time-average hologram of the reference article by vibrating the reference article at a second amplitude of vibration, wherein the second amplitude of vibration is lower than the first amplitude of vibration and the second amplitude of vibration is selected so that the second reference time-average hologram reveals a second reference indication of the known anomaly against a second reference background,
   generating a first time-average hologram of the article while vibrating the article at the first amplitude of vibration,
   generating a second time-average hologram of the article while vibrating the article at the second amplitude of vibration,
   comparing each of the holograms of the article and each of the reference holograms to each other to detect differences between the holograms, and
   characterizing the article with regard to the difference detected.

2. The method of claim 1, wherein the first reference indication of the known anomaly is a sharply defined strongly contrasting, darkened area, corresponding to the location of the known anomaly, which is clearly discernible from the first reference background, and the second reference indication of the known anomaly is a darkened area, corresponding to the location of the known anomaly, that is just discernible from the second reference background.

3. The method of claim 1, additionally comprising:
   generating a third reference time-average hologram of the reference article by vibrating the reference article at a third amplitude of vibration, wherein the third amplitude of vibration is higher than the first amplitude of vibration and the third amplitude of vibration is selected so that the third reference time-average hologram reveals a third reference indication of the known anomaly against a third reference background, and
   generating a third time-average hologram of the article while vibrating the article at the third amplitude of vibration.

4. The method of claim 3 wherein the third reference indication of the known anomaly is a darkened area which is just discernible from the third reference background.

5. The method of claim 1 or 3 wherein the known anomaly is a discontinuity in a bonded joint and the article is characterized as free of discontinuities if none of the holograms of the article reveals an indication of a discontinuities and as defective if each hologram of the article reveals an indication of a discontinuity.

6. The method of claim 3, additionally comprising:
   generating a plurality of reference time-average holograms of the reference article while vibrating the reference article, wherein the reference article is vibrated at each of a plurality of particular amplitudes of vibration and each reference time-average hologram is generated at a different particular amplitude of vibration of the plurality of particular amplitudes of vibration and wherein each of the plurality of particular amplitudes of vibration is higher than the second amplitude of vibration and lower than the third amplitude of vibration,
   generating a plurality of time-average holograms of the article, while vibrating the article, wherein the article is vibrated at each of the plurality of particular amplitudes of vibration and each time-average holograms of the article is generated at a different particular amplitude of the plurality of particular amplitudes of vibration.

* * * * *